Nov. 23, 1937.    A. V. D. WILLGOOS    2,099,785
ENGINE INTAKE SYSTEM
Filed Oct. 27, 1934
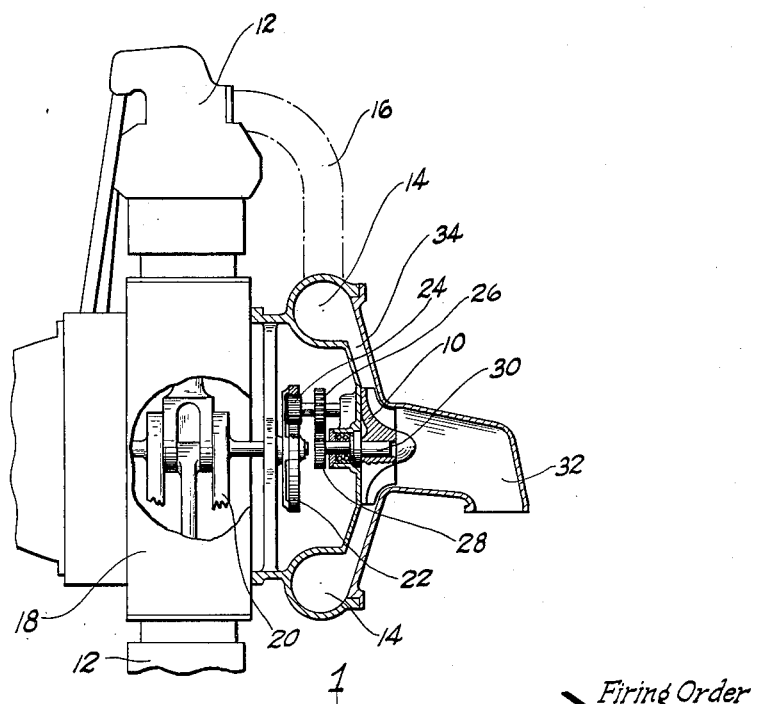
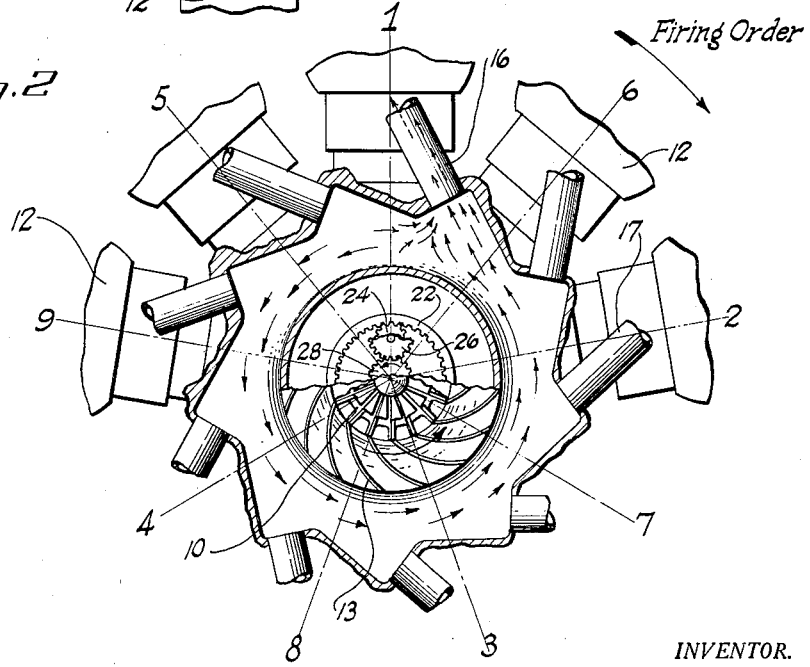
INVENTOR.
Andrew V.D. Willgoos
BY Harris G. Luther
ATTORNEY Patented Nov. 23, 1937

2,099,785

UNITED STATES PATENT OFFICE 2,099,785

ENGINE INTAKE SYSTEM

Andrew V. D. Willgoos, West Hartford, Conn., assignor, by mesne assignments, to United Aircraft Corporation, a corporation of Delaware Application October 27, 1934, Serial No. 750,349

3 Claims. (Cl. 123—119)

This invention relates to an engine intake system.

In airplane engines of the radial type in which super-charger blowers are used, these blowers rotate in the same direction as the engine crank shaft which is also the same direction of rotation as the engine firing order. Air or a fuel-air mixture is conducted from the blower into an annular chamber usually surrounding said blower. Outlets at spaced points in the periphery of this chamber lead the air or mixture to the several cylinders. Because this air or mixture is led to the annular chamber from a blower, it usually has considerable rotational velocity in spite of the attempts that are made to reduce velocity head to static head. When a portion of the air or mixture is removed from the annular member to charge a cylinder, it leaves a void at that particular region. This void is carried along with the rotating mixture and arrives at the intake pipe of the next cylinder to be charged just as that cylinder is being charged. This charge for the second cylinder is therefore drawn from a portion of the mixture having a reduced pressure and the amount of the charge is correspondingly reduced.

One object of this invention is therefore to provide an intake system in which the supplying of air or fuel mixture to one cylinder will not affect the supply of air or fuel mixture to a succeeding cylinder.

Another object of this invention is to provide an efficient intake system.

A further object of this invention is to provide an engine in which the supercharger blower rotates in a direction opposite to the direction of rotation, or the firing order, of the engine.

Other objects and advantages of this invention will be apparent from the accompanying specification and from the drawing which illustrates what is now considered the preferred embodiment.

Figure 1 is a diagrammatic side view, partly in section and with certain parts omitted, showing an engine having a supercharger blower.

Figure 2 is a diagrammatic end view, partly in section and with portions broken away showing a portion of the blower and intake system of an engine.

In the illustrated embodiment the impeller is rotated in a direction opposite to the direction of rotation of the engine crank shaft. The engine cylinders 12 are mounted upon a crankcase 18 in the usual manner. With the exception of the blower and its associated parts the engine may be a standard commercial engine, having the usual cams and valves for charging the cylinders in timed relation with the crank shaft rotation and the engine firing order. The valve and cam construction is not shown but may be substantially the same as shown in my Patent No. 1,950,467. The crank shaft 20 drives an internal gear 22. This internal gear meshes with an external gear 24 mounted to turn concentric with another external gear 26. Gear 26 in turn meshes with a gear 28 mounted on the shaft 30 of the blower impeller 10. By this type of drive the impeller is given a direction of rotation opposite to the direction of rotation of the crank shaft. Although I have described a specific mechanism for producing the reverse rotation it will be understood that this same result may be obtained by a different form of mechanism and that the gears shown are for illustrative purposes only. It should therefore be understood that my invention is not limited to this specific mechanism.

The conduit 32 leads either from a carburetor or an air supply to the blower intake. The blower impeller 10 discharges through the diffuser 34 into the annular chamber 14. The intake pipes for the various cylinders, two of which are indicated by the numerals 16 and 17, are connected with the circumference of the annular chamber 14 and receive their air or mixture charge therefrom. These pipes are shown as substantially tangential to the chamber 14, but it is to be understood that they may be arranged radially or in various other ways without departing from the spirit of my invention.

The firing order of the various cylinders has been indicated by the numerals 1 to 9 inclusive and the direction of rotation of the impeller has been indicated by an arrow under the impeller. The air or mixture discharged by the impeller retains some of its rotational velocity after having passed through the diffuser section 34, which rotational velocity is indicated by the arrows in Figure 2. The arrows in this figure also indicate in general the direction of flow of the fluid in the annular chamber 14 at the time cylinder number 1 is receiving its charge. The withdrawal of this charge through conduit 16 creates a void which travels along in the same direction as the fluid rotating in the chamber 14.

In accordance with my invention, this direction of travel will be towards cylinder number 9 and away from cylinder number 2, the next cylinder to be charged. As will be noted from the diagram in Figure 2, cylinder 2 will thus be drawing its charge from a point removed from the disturbed area and at a point where the fluid in the annular chamber instead of having a reduced pressure and velocity will have a slightly higher pressure and velocity. This pressure difference will produce a higher supercharger efficiency.

While I have shown one form of engine and supercharger blower, it is expressly understood that I do not desire to limit myself to that particular construction, it being obvious that the invention may be applied to different engines and used in different ways and various changes may be made in the structure without departing from the spirit and scope of the invention as defined by the following claims.

What I claim is:

1. In an engine having cylinders arranged around a crank shaft and adapted to be fired in a predetermined rotational order and direction, means for conducting fluid portions from an annular chamber to said cylinders in the same rotational order, and direction, to charge said cylinders and means for rotating the fluid in said chamber in the opposite rotational direction.

2. In an induction system, in combination, means for forcing fluid into an annular chamber and rotating it in one direction therein and means for periodically removing fluid from said chamber, said removing means comprising a plurality of outlets removing fluid successively in the rotational direction opposite to the direction of rotation of the fluid in said chamber.

3. In a radial engine, a blower, an annular chamber surrounding said blower and adapted to receive fluid discharged by said blower, cylinders having a firing order in the same direction as the rotation of the crank shaft, conduits connecting these cylinders with said annular chamber and adapted to conduct fluid to said cylinders in the same order as said firing order, means operably connecting said crank shaft with said blower, said means driving said blower in a direction opposite to the direction of rotation of the crank shaft.

ANDREW V. D. WILLGOOS.